(12) United States Patent
Asani

(10) Patent No.: US 7,430,540 B1
(45) Date of Patent: Sep. 30, 2008

(54) SYSTEM AND METHOD FOR SAFE FINANCIAL TRANSACTIONS IN E.COMMERCE

(76) Inventor: Karim Asani, 12 Deerford Road, Apt. #201, North York, ON (CA) M2J 3J3

( * ) Notice: Subject to any disclaimer, the term of this patent is extended or adjusted under 35 U.S.C. 154(b) by 0 days.

(21) Appl. No.: 09/523,789

(22) Filed: Mar. 13, 2000

(51) Int. Cl.
 *G06Q 20/00* (2006.01)
(52) U.S. Cl. ........................................ 705/41
(58) Field of Classification Search ............... 705/39, 705/44, 74, 40, 41; 902/1–3
See application file for complete search history.

(56) References Cited

U.S. PATENT DOCUMENTS

| | | | | |
|---|---|---|---|---|
| 4,270,042 A | * | 5/1981 | Case | 235/379 |
| 4,823,264 A | * | 4/1989 | Deming | 235/379 |
| 4,947,028 A | * | 8/1990 | Gorog | 235/375 |
| 5,093,787 A | * | 3/1992 | Simmons | 235/379 |
| 5,283,829 A | * | 2/1994 | Anderson | 235/379 |
| 5,652,786 A | * | 7/1997 | Rogers | 379/91.01 |
| 5,671,285 A | * | 9/1997 | Newman | 380/243 |
| 5,699,528 A | * | 12/1997 | Hogan | 705/40 |
| 5,920,847 A | * | 7/1999 | Kolling et al. | 705/40 |
| 5,963,924 A | | 10/1999 | Williams et al. | |
| 5,970,478 A | | 10/1999 | Walker et al. | |
| 6,016,484 A | | 1/2000 | Williams et al. | |
| 6,029,152 A | | 2/2000 | Bublitz et al. | |
| 6,038,549 A | * | 3/2000 | Davis et al. | 380/2 |
| 6,044,362 A | * | 3/2000 | Neely | 705/26 |
| 6,338,049 B1 | * | 1/2002 | Walker et al. | 235/379 |
| 2001/0044787 A1 | * | 11/2001 | Shwartz et al. | 705/78 |

* cited by examiner

*Primary Examiner*—James P Trammell

(57) ABSTRACT

A system, method and program for executing securely e-financial transactions over the Internet between merchants, clients and financial institutions using an electronic programmable device such as an electric vault, microcomputer or a smart card. The systems offers various secure options from which to make e-commerce financial transactions without entering credit card or personal financial information.

11 Claims, 7 Drawing Sheets

SYSTEM AND METHOD FOR SAFE FINANCIAL TRANSACTIONS IN E.COMMERCE

FIELD OF THE INVENTION

The present invention relates to e-commerce transactions by providing alternative methods for payment of purchases made on the internet, without disclosing sensitive personal information such as credit card data, bank account information and the like. Specifically, this invention relates to the following systems and methods which use existing technology to facilitate financial transactions and provides a platform for safe purchase-payment activities over the Internet.

BACKGROUND

With the advent of data networks such as the Internet, World Wide Web, bulletin board systems, and commercial on-line services, electronic commerce has become one of the fastest growing segments of the economy. The most readily available form of commerce is the exchange of information to an end-user for payment. While these data networks are adept at disseminating information, collection of payment has been problematic—holding back the growth of electronic commerce.

Methods of collecting payment for information can be separated into two broad categories, on-line and off-line. On-line methods include the transfer of credit card numbers and the use of digital cash U.S. Pat. No. 6,029,152 off-line methods require the end-user to mail in cash or checks. These approaches can be cumbersome, time consuming and risky from a security standpoint.

Credit accounts are widely used for non-cash payments for goods and services. The authorized user of the account is issued a card and account number that can be used to charge purchases to the account. The credit card issuer, such as a bank, pays the merchant, and the cardholder then pays the card issuer. The issuer's revenues are received by charging a merchant a fee for each transaction, and charging the cardholder monthly fees and interest on unpaid balances.

U.S. Pat. Nos. 5,963,924 and 6,016,484 issued to Humphrey Williams et al. describes an electronic monetary system that emulates a wallet used for keeping money, credit cards and other forms of payment. Once a consumer has decided to make a purchase from the merchant, the application requests a user name and wallet password, display merchant and order information, request that a user select a payment instrument from the wallet. The payment instruments include credit cards, electronic checks, electronic money, electronic coin, debit card and smart cards.

However, transferring credit card numbers via the Internet, for example, carries the risk of theft from unscrupulous computer hackers and thieves, who can tap into a server connected to the Internet and search for messages containing 16 digit numbers. Recent events demonstrate that hackers are becoming more and more sophisticated, and it is only a matter of time before they are able to decipher encryption technologies designed to protect personal and financial information transmitted over the Internet Digital money systems (e.g. Digi-Cash, eCash, etc.) are presently a long way from practical implementation, with no standards having yet been established.

U.S. Pat. No. 5,970,478 issued to Jay S. Walker describes an apparatus, method and program for customizing credit accounts in exchange for a fee to be collected by the credit card issuer.

Payment systems which rely on credit cards (whether over the Internet or otherwise) also have an obvious limitation customers with bad credit may not qualify for a purchase. Besides, only consumers with credit cards can make purchases. Many potential customers may not qualify for a credit card for a variety of reasons, but may have adequate disposable income to make a particular purchase. Reducing the reliance on credit cards as a form of payment for Internet transactions will, therefore, increase the consumer base for e-commerce.

An added disadvantage to the use of credit cards is that transaction costs may limit their utility for low dollar value purchases. Vendors are discouraged from billing small amounts on credit cards because of the relatively high transactional costs as a percent of the sale. Irregular, short-term or single usage purchases over the Internet cannot be charged in an economical manner for either the supplier or the consumer. For example, if an information provider wanted to charge twenty-five cents to view a one time copy of a "top ten" list, the end-user obviously would not want to set-up a credit or cash account as the expense to establish such an account would exceed the value of the one-time information obtained (particularly when the user would have to divulge sensitive information in order to set up the account). The minimum practical credit card charge exceeds $2.50.

There are specific challenges associated with the disclosure of information over the Internet. There have been attempts to use existing telephone-based billing and collection systems. One example, is a 900-number-based billing system. However, the 900 system has several disadvantages, including among others, that it is cumbersome, difficult to use, and generally ineffective.

Moreover, all of the existing systems use codes that are simply passwords, and are limited to the particular data site for which they were issued. These codes do not represent "value" and therefore cannot be used to control or limit access to digital data.

A second major problem with existing systems is that they require the information site to be "intelligent" and able to store and maintain codes in order to know which codes are valid (e.g. when does a code expire). This greatly increases the information provider's cost for providing digital information and limits the number of information providers that can afford the additional overhead. Thus, these prohibitive cost reducing e-commerce and competition on data networks.

A third major problem with existing systems is that neither the data network nor the information providers are connected to the billing system. This severely limits their ability to provide even basic customer service to users of the system.

A fourth major problem with existing systems relates to the use of the 900 system itself. Information providers are limited as to the amounts charged for information. The 900-number system provider in existing systems offers no more than seven different dollar amounts they can charge on their 900-numbers. Each 900-number represents a different dollar amount charged to a consumer. For example, a 900-number system provider has three different 900-numbers, each corresponding to a different dollar value, $10, $15 and $20. An information provider using such a system for billing would be limited to those dollar amounts regardless of the value of the information they were selling. Additionally, the dollar charges cannot reflect the number of times a user, or multiple users, has had access to information, and the consumer is billed immediately for the 900-number call, even if they never receive the digital information.

A specific example of one such system is known as Web 900, offered by Logicom, Inc. In that system, the user calls a given 900-number, in exchange for which he is provided a code valid for a specified time period for unlimited access to a particular information site, and the information site locally verifies the validity of the code. There are several problems with this arrangement. First, there is no way to control access to the information by the number of uses. Users are forced to pay for unlimited access even if the user desires one piece of information or single use access. Second, since the data network has no way of preventing access to unauthorized users in possession of the code, the code could be posted to a BBS or newsgroup on the web, allowing for repeated uncontrolled use by anyone reading the posting. Third, the codes provided are usable only at a particular information site. A code provided for the purchase of five dollars worth of information at information site "A" cannot be used for the purchase of five dollars worth of information at site "B." Finally, the data network must have the ability to store codes, and must have software to verify each code entered.

The most powerful barrier to e-commerce is consumer psychology. Given the sophistication of hackers, the severe personal and financial consequences of their activities and media attention on their activities, many consumers will never feel completely comfortable providing their credit card numbers over the Internet, even if the communications are ostensibly made secure. Given that time is at a premium, many of these consumers would consider making purchases over the Internet if their personal and financial information was not at risk. Finding a way to make the risk measurable and manageable would, therefore, encourage a significant number of consumers to start making purchases over the Internet.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow one of ordinary skill in the art to make and use the inventive concepts will follow in later sections.

A principle objective of the present invention is to provide an effective and safe system and method of use of existing and new technologies to facilitate financial transactions over the Internet, by facilitating e-commerce financial transactions between merchants, clients and financial institutions/central clearing house through the use of an electronic programmable device such as electronic vault, microcomputer device or smart card. Specifically, the present invention is novel because it provides an e-trade or buyer much needed to secure options from which to make e-commerce financial transactions without entering their credit card or other personal financial information. The present invention therefore provides a system that enhances the ability of merchants and financial institutions to conduct financial transactions through the Internet, thereby significantly increasing their profit potential. An additional advantage of the system is that this method reduces the likelihood of credit card fraud and loss through delinquent accounts.

The present invention also has a unique feature in that once the device is sold to the client, its serial number (registered at the point of purchase) as well as the corresponding software associated with the device selected by the consumer, is sold at the same time. The two products act as lock and key. The rapidly and efficiently input/output (I/O) device has a built in safeguard that ensures that the theft or loss of the (I/O) device render it useless because neither the I/O device unit nor the software unit can function alone. In other words, neither unit can be operational without both components.

Another embodiment of the present invention also enables popular items such as hand held PCS/smart phones/microwave communicable devices to be used in making safe purchases over the Internet. The devices installed onto these items are small in size so that they can still be portable. These devices employ the use of microwave or similar technologies so as to make them wireless.

Yet another embodiment of the present invention also provides a safe and secure way to transfer monies through already existing centralized clearinghouses that banking and other financial institutions employ to conduct inter-institutional banking services.

The present invention can also employ the use of Automated Teller Machines (ATMs). ATMs would require only minor modification so as to enable the client to directly transfer monies from their checking or other account into their e-commerce account, thereby providing the client with a convenient source of additional purchasing power to use on the Internet. This provides the client with a fast, safe and effective way to maintain/update their e-commerce account.

The present invention also provides the client with the ability to obtain their account status or receive an electronic statement. This "smart" billing/transaction system not only remembers the spending/buying habits of the client, but also performs a simultaneous/instantaneous Internet searches for similar products and makes the search results available to the client at competitive prices.

A preferred embodiment of a system in accordance with the present invention is preferably practiced in the context of a personal computer based workstation.

DETAILED DESCRIPTION OF THE VARIOUS PROCESSES

Figure 1:
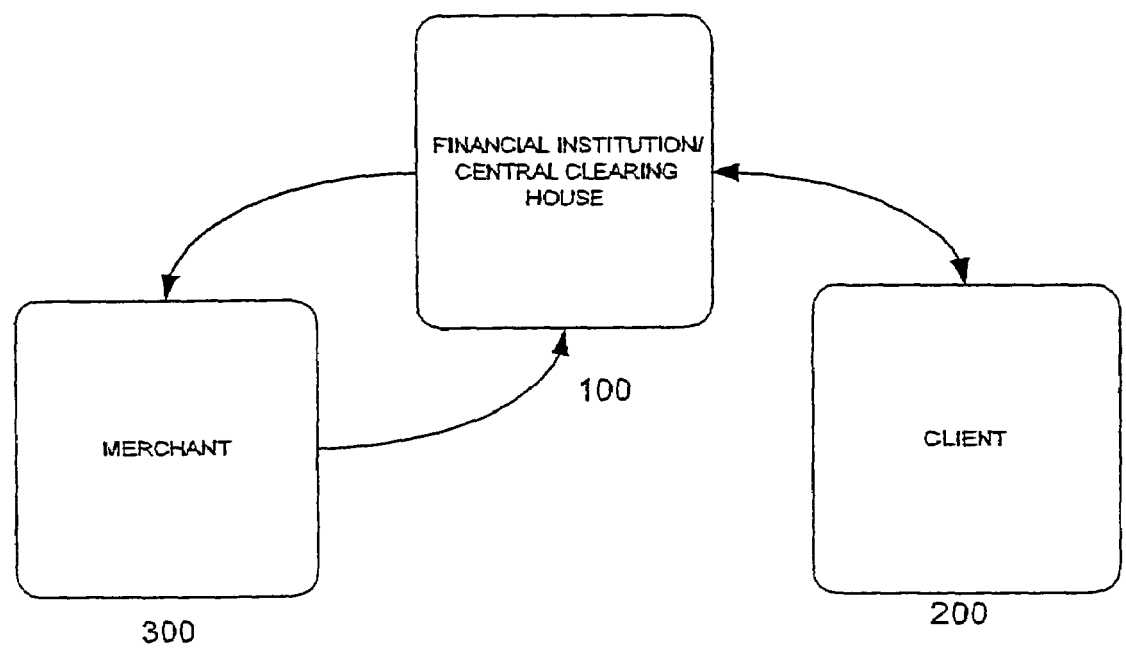
FIG. 1 illustrates the flow of information

A representative hardware environment is depicted herein. The entire system is made up of a financial institution/central clearinghouse 100, client 200 and merchant 300 as depicted in FIG. 1. The financial institution/central clearinghouse acts as a liaison between the client and the merchant. Currently, most banking institutions employ the use of some sort of central clearinghouse that is used to facilitate transactions between banks. Therefore, this additional functionality could be incorporated into the existing framework of the present banking community with minimal disruption.

Figure 2:
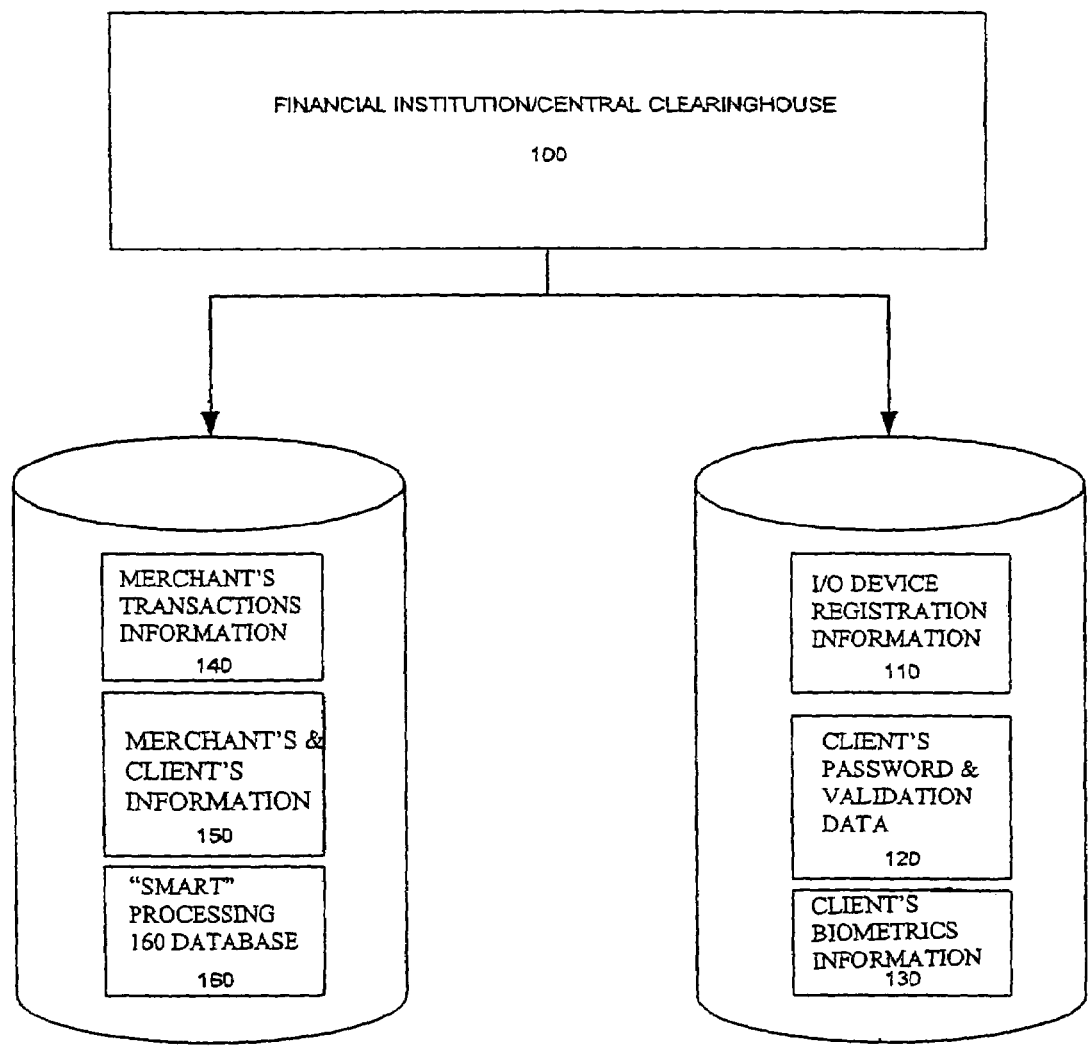
FIG. 2 is a block diagram of the financial/central clearinghouse.

FIG. 2 is the layout of the financial institution/central clearinghouse 100. The key role of the financial institution/central clearinghouse is to secure verification & processing of information received from the client to the merchant. It also facilitates the transfer of funds from the client(s) to the merchant(s) bank account. All the information/data is stored in two databases. One database stores the merchant's transaction information 140, merchant's and client's financial information 150 and "smart" processing 160 database respectively. The other database is for information such as the client's I/O registration information 110, client's password and validation data 120, and the client's biometrics information 130 respectively.

Figure 3:
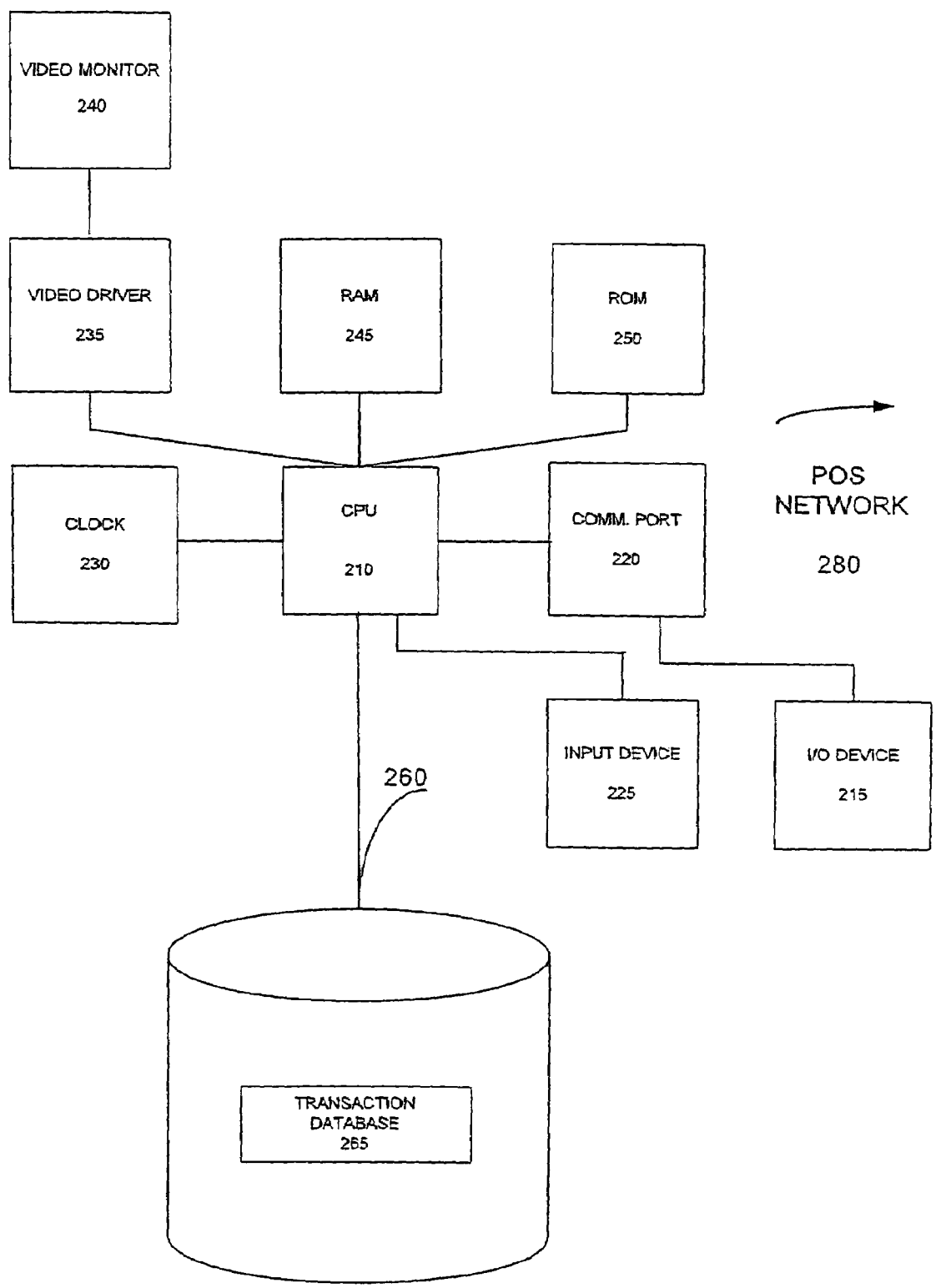
FIG. 3 is a block diagram showing the end-user/client network.

FIG. 3 gives a more general overview of the integration of the various end-user processes 200. The client communicates with the merchant through an end-user computer. Those skilled in the art will appreciate that personal computer systems, mobile devices that provide Internet access, other wireless communicable devices satellite systems and microwave links may be used. The end-user computer comprises of a CPU 210, Input device 225 (e.g., keyboard), communication port 220, clock 230, video driver 235 connected to a video monitor 240, RAM 245, ROM 250, data storage unit 260, and a I/O device 215. Through the use of a removable I/O device 215, the client can add a specific credit value ($) (i.e., validate) to the I/O device. This Transfer of funds to the I/O device is facilitated either by the financial institution or a merchant. Once the device has been registered and validated, the client can make the Necessary purchases from the merchant's web site/point of sale (POS) network, 280. The product and pricing information is transmitted to a safe and secure financial Institution/central clearing house via a communication link COMM.PORT 220, where a confirmation of all the purchases made is relayed back to the client, so as to verify that the information is indeed correct. All the information transmitted is secure but not limited to technologies such as public key cryptography. The information being transmitted includes: the product and pricing, a unique validation code that acts as a lock and key between the device and the software, and a secure password to initiate the e-commerce transaction. At the financial institution/central clearinghouse, the necessary funds are transferred from the client bank account or e-commerce account to the participating merchant's bank account (all participating merchants would have to submit their bank/financial transit numbers and other pertinent information so as to facilitate the e-commerce transaction). All the data is stored in a transaction database, 265.

Figure 4:
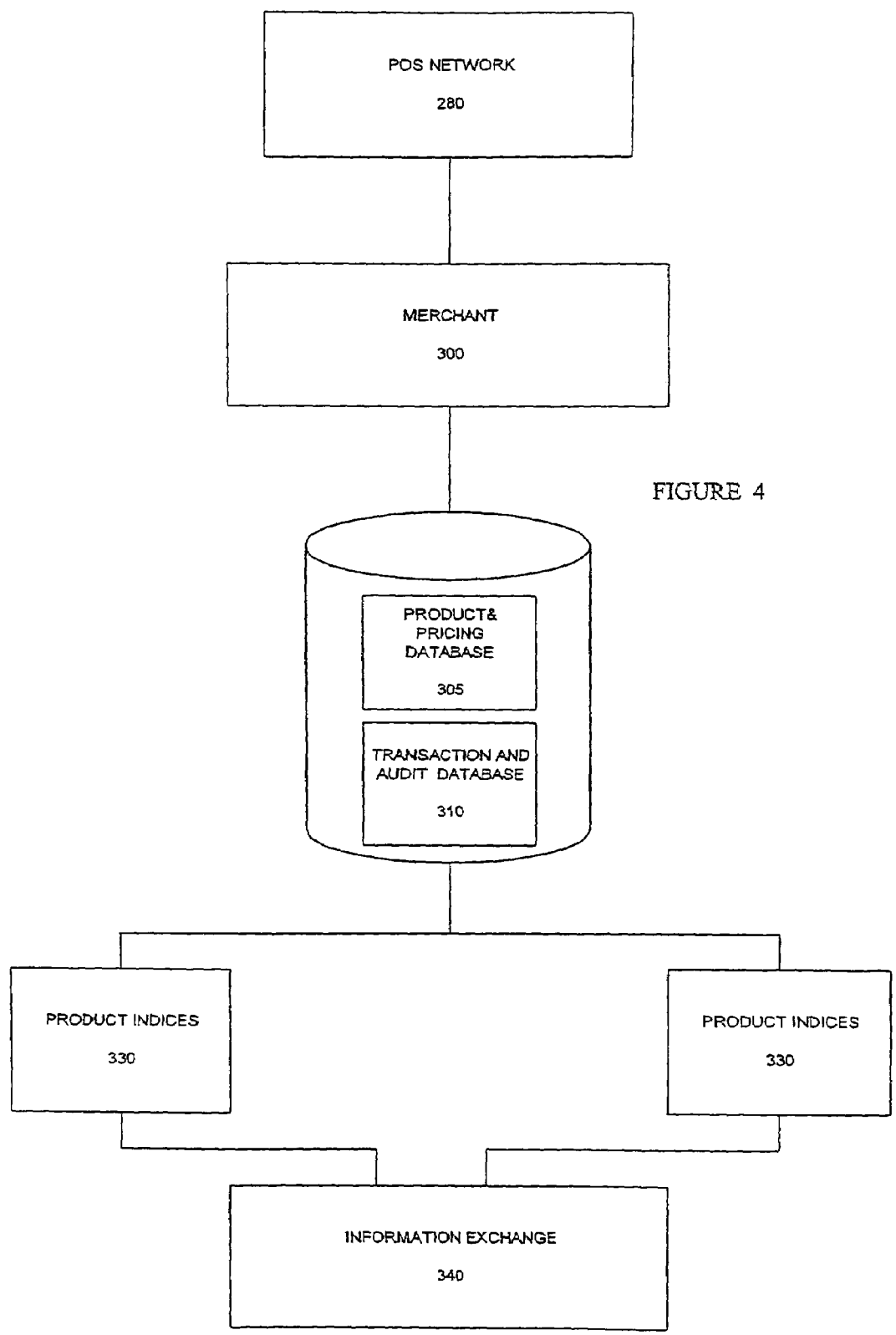
FIG. 4 is a block diagram showing the merchant's network.

FIG. 4 represents an embodiment of the merchant's network. The network is made up of the merchant's web site on the World Wide Web, POS NETWORK 280, Merchant 300 interactive product and pricing database 305, transaction audit database 310, product indices 330, and an information exchange 340. The databases store all pertinent transaction information such as product and pricing information, consumer preferences and other web related statistics. The transmission of all the information is facilitated via the information exchange.

Figure 5A:
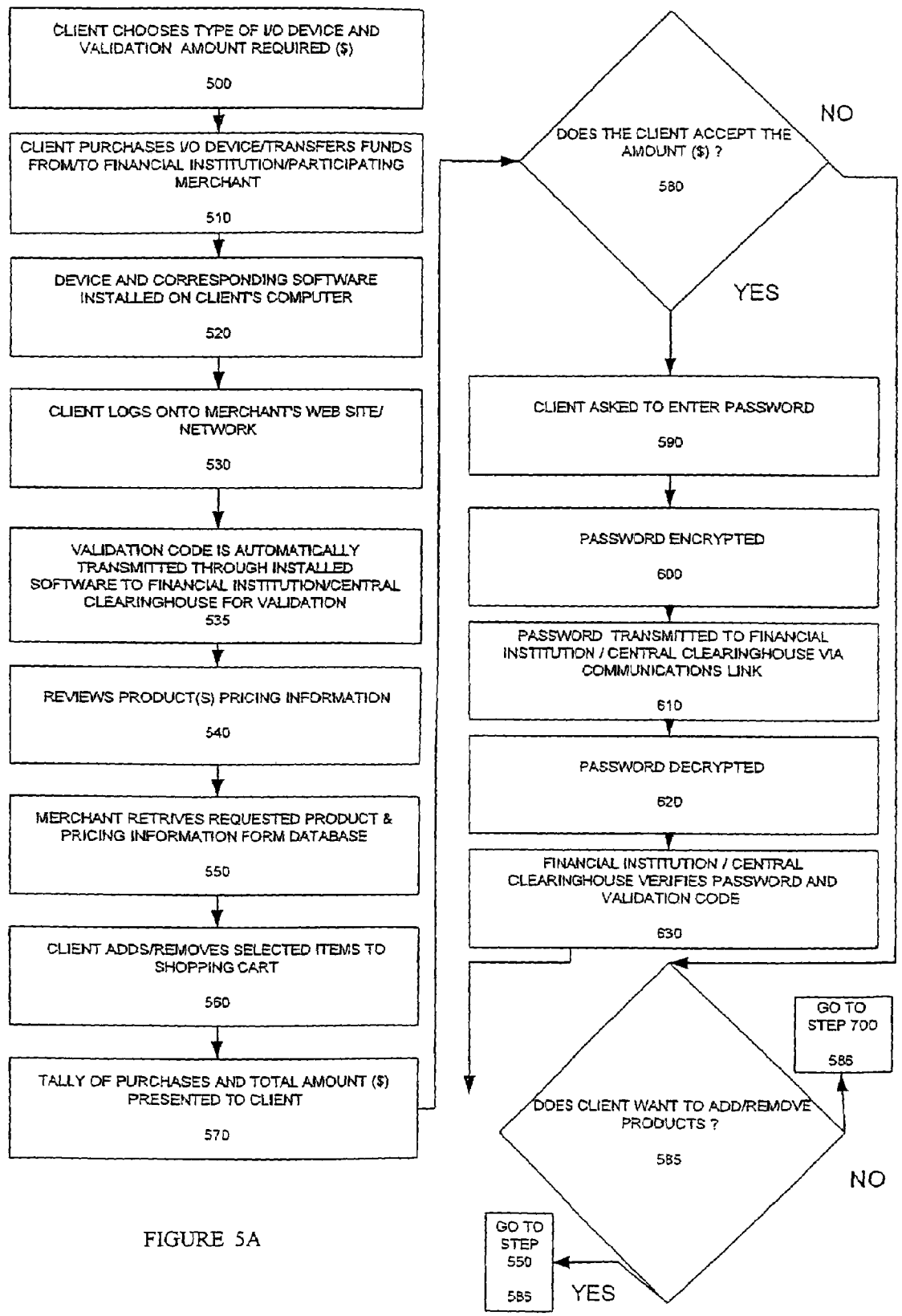
FIGS. 5A and 5B are a block diagram showing the process flow diagram

FIG. 5A illustrates the mechanics of the various transaction processes at the financial institution/central clearinghouse. At step 500 the client chooses the type of I/O device and validates the device. The client instructs the financial institution at step 510 to validate the I/O device for a specific dollar amount by transferring funds or paying up front for the validation, as shown. The financial institution then registers the I/O device as well as provides the client with a secure password that is stored in 110. Similarly, the merchant communicates to the financial institution the necessary financial information, such as transit number(s), and account number(s). All the financial information is stored in the merchant and client financial information database 150. Once the client purchases the I/O device 215 and has the corresponding Software step installed in step 520, the device is attached onto the parallel port of the COMM.PORT 220. Personal communication systems (PCS), mobile devices that provide Internet access, other wireless communicable devices, satellite systems and microwave links may also be used. At step 530 the client logs on to the merchant's website/POS network, 280.

The client then logs on the merchant's website step and browses through the merchant's website at step 540 and reviews the product and pricing indices 330. Once the client has decided on the choice of product(s), the merchant retrieves the requested product(s) and pricing information step 550 from the product and pricing database 305. While the client is browsing the merchant's website, a communication link is automatically established between the client and the financial institution/central clearinghouse 100. Specialized features are built into the software that capture and transit this information to the financial institution. This link enables the device validation code to be automatically transmitted to the financial institution/central clearinghouse regardless of whether or not a purchase is made. This process ensures that if the client decides to make a purchase, then the processing time is greatly reduced. This also provides the merchant a tremendous cost saving in that the merchant does not have to invest in expensive e-commerce financial transaction software. The items are selected and added to the shopping cart as indicated in step 560. In step 570 a tally of all the purchases and pricing details obtained from 305 is presented to the client on the video monitor 235. The client is then prompted at step 580 and asked if he accepts the items displayed on 235. If the client accepts the indicated cost, then the client is prompted to enter the secure password as shown in step 590.

Figure 5B:
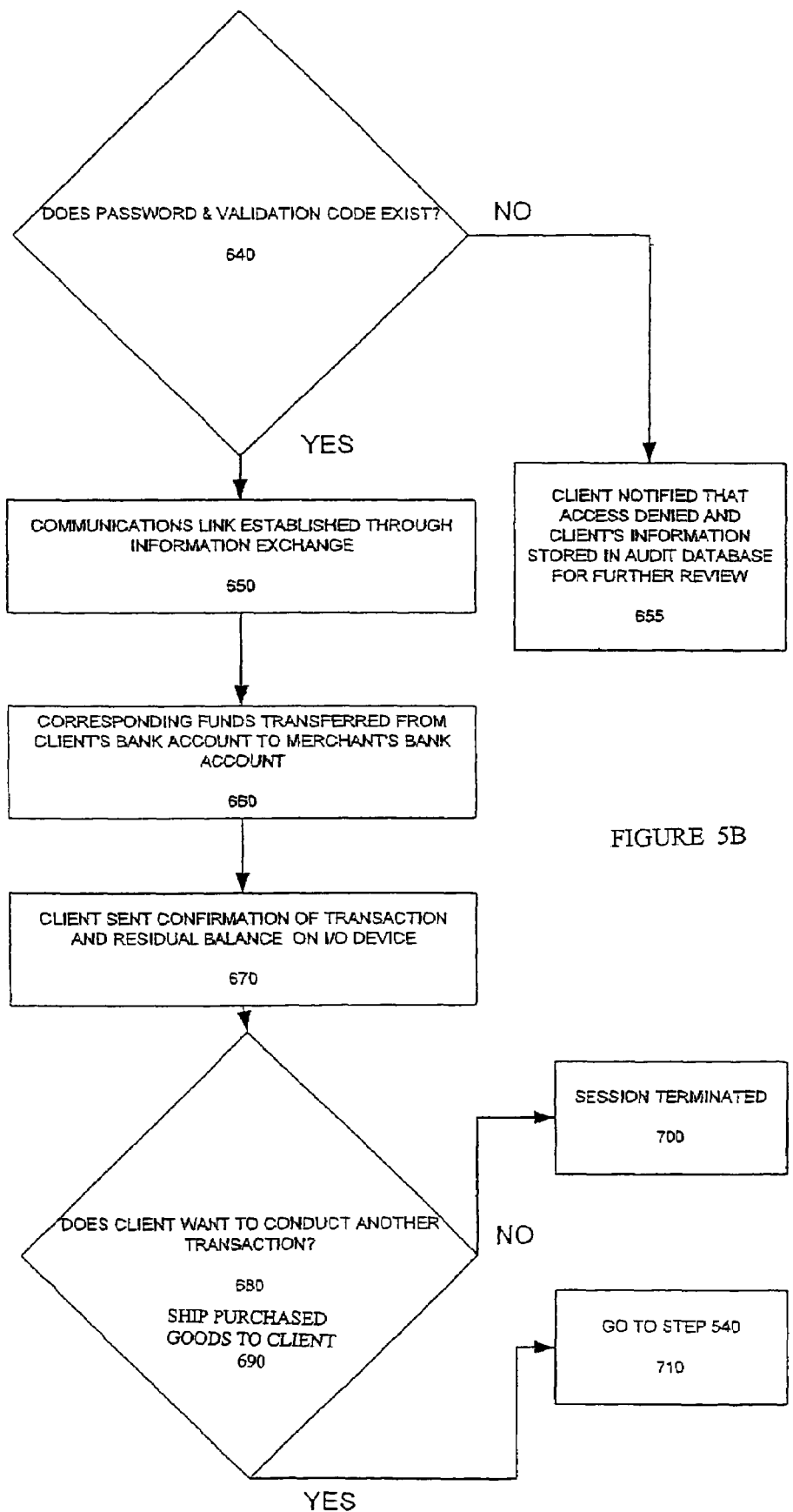

The password is transmitted to the financial institution/central clearinghouse through the use of, but not limited to, the use of public key cryptographic technology similar to technology steps 600 & 610. Those skilled in the art would appreciate that other secure methodologies employing communication mediums such as microwave/fiber optics/wireless technologies may also be used. At step 620, the password is decrypted by the financial institution/central clearinghouse and stored in 120. The password along with the validation codes at step 630 of the I/O device is validated using 110 & FIG. 5B shows a search is conducted at step 640, so as to verify and validate the corresponding information made available to the financial institution/central clearing house at the time of registration in 110 and 120. If the verification is a success then at step 650 a communication link is established between the financial Institution/central clearing house and the merchant 300. At step 670, the financial to the client before the final purchases are made. This option safeguards the client's interest, in that it offers the client the most competitive pricing for the selected product(s).

Figure 6:
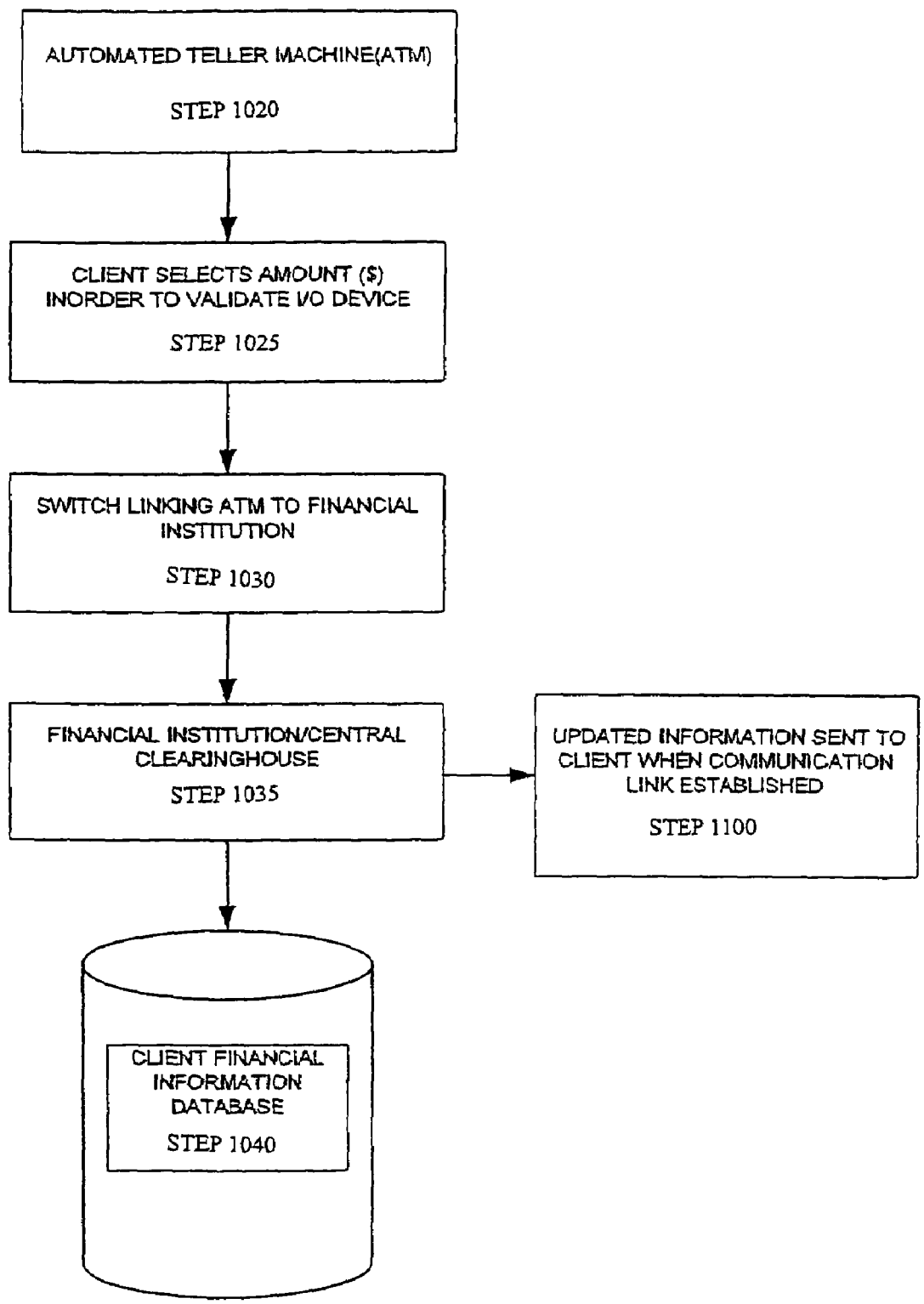
FIG. 6 is a block diagram showing ATM network.

FIG. 6 outlines a method for the client to transfer more funds to I/O device through the use of an Automated Teller Machine (ATM) as illustrated in step 1020. Step 1025 offers the client the ability to transfer funds using ATM. ATM's could be programmed to include an additional feature such as providing the client the ability to directly transfer monies from their checking or other accounts into their e-commerce account step 1025. At step 1030, the client's updated information is sent to the financial institution/central clearinghouse 100, as shown in step 1035. This provides the client additional purchasing power on the Internet. This provides the client a fast, safe and effective way to maintain/update the client's e-commerce amount(s) step 1100. And store it at step 1040

All of the database can either exist as one single database or be relational databases.

This invention can also employ the use of either a microchip or smart card or I/O device designed for mobile Internet devices that can either be integrated into the circuitry or plugged-in as a slim "smart" chip/card. The PCS or mobile Internet device is taken to an authorized mobile phone dealer, financial institution or merchant to validate the device with the required funds, so as to facilitate e-commerce and other transactions.

As an additional security feature for mobile Internet phones or similar devices, the use of voice/data pattern recognition can be used as a secure option to create passwords. At the time of purchase, the client can select one of the above methods of transmitting the passwords to the central clearinghouse. The client is asked to enter a secure password that is transmitted through public key cryptography or similar technologies to the central clearinghouse. Through modern voice recognition technologies, the secure password is matched to the voice sample provided by the client at the time of purchase of the device. This technology is particularly useful with mobile communicable devices that use wireless application protocol (WAP) such as mobile phones that also provide Internet access.

Another unique, safe and secure feature that can be presented to the client is the use of biometrics. Biometrics usually require a small sample such as a finger or thumb imprint that is stored in a database for later use. The use of biometrics within this invention requires that, at the time of purchase, the client presents either a thumb or finger imprint or a similar piece of physical identification. This requires the use of a biometrics reader that stores the client's imprint onto a database which captures only biometrics data. When a client makes a purchase over the Internet/worldwide web using a PCS or a mobile Internet device, the client is prompted to physically touch a designated area on the screen or specially designed area adjacent to the keypad that registers the imprint. With the aid of a state of the art biometrics reader, the information is processed identifying unique characteristics of the client's genetic make-up from the client's finger/thumb imprint, which is matched to a sample supplied by the client at the time of purchase of the I/O device. If the two samples correspond, then the finds can be transferred from the client's account(s) to the merchant's account. All the information is transmitted through the use of public key cryptography or similar secure technologies to the financial institution/central clearinghouse.

An additional embodiment of the present invention includes a financial portal (similar to the central clearinghouse) wherein all Business to Business and Client to Merchant transactions can take advantage of a central payment system geared towards facilitating e-commerce financial transactions. In this system, most major banking/financial/brokerage houses can pull resources together instead of competing against each other, so that merchants can subscribe to a common payment system. Clients can also register through their financial institutions and participate in this common payment system. This eliminates the need to purchase the I/O device and only requires the software and a password from the financial institution. Both the client and merchant submit their financial information (such as bank transit number, bank account information and security features) to protect their e-commerce accounts. A preset limit can be established on the e-commerce account so that in the case of fraud, only a small dollar amount($) is at risk. This can provide cost savings for both the client and the merchant since there is no need to purchase or implement any sophisticated payment systems such as digital tokens, e-cash, etc.

In another embodiment of the present invention, financial institution/central clearinghouse can facilitate the provision of confidential client information in the manner described below. Such information may include consumer product and pricing preferences, personal information (i.e. name, age, sex, ethnicity, occupation, level of formal education, how did they hear about the site, etc) and demographic data (zip code, mailing address, country of residence, etc). This data provides invaluable marketing information to a wide variety of businesses. The financial institution/central clearinghouse include a disclaimer that enables the client to "opt out" of providing the above mentioned data. This complies with the possibility of new legislation that safeguards consumer's financial and confidential information.

In another embodiment of the present invention, a random number generator could generate the password supplied by the financial institution/central clearinghouse. The password is generated for each session that the client is conducting a transaction. This eliminates the need for the client to recall the password and more importantly the password would not be stored on the client's computer. Those skilled in the art appreciate that this applies to other mobile devices/PCS/PDA, microwave and satellite communicable devices. When the client logs on to the merchant's web site, the I/O validation code is automatically transmitted to the financial institution/central clearinghouse. Once the validation code is validated, a password is generated through a random number generator. Through encryption, the password is transmitted to the client where, through the installed software, the password is decrypted and presented to the client. While this is happening, the client is able to view products and otherwise use the computer. When the client has accepted the tally of all the purchases, the client is prompted to enter the supplied password. The password is then sent to the financial institution/central clearinghouse through secure encryption and decryption methods.

In another embodiment of the present invention, the software can have a programmable virtual vault having the same functionality as the "physical I/O device". The virtual vault eliminates the need to attach any I/O device onto the client's computer and other mobile devices/PCS/PDA'S, microwave and satellite communicable devices. The client only purchases the specialized software from the financial institution/central clearinghouse. The software is customized to the client's needs (i.e. dollar amount of validation required, validation code and synchronizing the device to the random number generator so that the password is automatically decrypted and presented to the client). The I/O device can also include an EEPROM that can be programmed to the desired dollar amount.

While various embodiments of a preferred embodiment have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A data processing system for executing a secure e-financial transaction in an account, without disclosing any personal financial information, comprising:

a central controller including a CPU and a memory operatively connected to said CPU;

at least one terminal, adapted for communicating with said central controller, by transmitting the secure parameter to said central controller; said memory in said central controller containing a program, adapted to be executed by said CPU, for executing e-financial transactions for the secure parameter, wherein the secure parameter is a password or code; wherein said central controller receives the secure parameter from said terminal and executes the e-financial transaction for the account based upon the secure parameter, without requiring access to personal financial, banking or credit card information:

said system comprising:

a central controller located at a bank, said controller including a CPU and a memory operatively connected to said CPU;

a client's input/output device purchased from the bank for a given amount, said device having a secure password from the central controller assigned to it and installed onto the client's computer;

a merchant's website;

wherein the e-financial transaction starts with:

the client placing an order using the secure password assigned to the client's input/output device, the merchant website relaying the input data to the central controller; and the central controller validating the client's secure password and order and authorizing or denying the order based on the client's input/output secure password for the account, without accessing any personal data of the client.

2. The system according to claim 1, wherein the input/output device, is further adapted to transmit a customer's information to said controller, and said program in said memory executes the financial transaction in the account having the secure parameter based upon the customer's information.

3. The system according to claim 2, wherein the customer information comprises an account identifier that specifies a pre-existing bank account, and said secure parameter comprises a secure password.

4. The system according to claim 1, wherein said program in said memory is adapted to receive a customer acceptance via said terminal to enter into an account having the secure parameter and charge the customer the calculated amount of funds by debiting the customer's account and transferring the funds to a bank account specified by the customer.

5. The system according to claim 2, wherein the input/output device comprises an electronic vault, a microcomputer chip or smart card.

6. The system according to claim 3, wherein the secure password is transferred using an encryption technology.

7. A method of executing an e-financial transaction having at least one customer specified secure password, such that no personal financial information is disclosed during the transaction, the method comprising the steps of:

transferring a specified amount of funds to a central controller located at a bank through an electronic fund transfer or cash, receiving an input/output device and a secure password from the central controller, and installing the device on a consumer's computer, placing an order on a merchant's website using the secure password, relaying the inputs from the customer computer and the merchant website to the central controller via a terminal;

processing a program to execute or deny the e-financial transaction.

8. The method according to claim 7, further comprising the step of inputting customer information to the controller via the terminal, and wherein the step processing the program further comprises calculating the amount of funds based on the customer information.

9. The method according to claim 7, wherein the step of inputting the customer information further comprises inputting an account identifier that specifies a pre-existing bank account.

10. A data processing system for executing an e-financial transaction having at least one customer specified secure password, wherein personal financial information is protected through the use of an input/output device, comprising:

a CPU;

a memory operatively connected to said CPU, said memory containing a program, adapted to be executed by said CPU, for receiving the secure password and calculating the amount of funds having the secure password; and said input/output device, operatively connected to at least one of said memory and said CPU, for input of the secret password and for output of the funds.

11. A method of executing an e-financial transaction, wherein personal financial information is protected through the use of an I/O device, having at least one customer specified secure password using a CPU and a memory operatively connected to said CPU and containing a program, adapted to be executed by said CPU, for calculating a price, the method comprising the steps of:

receiving the secure password;

executing the program in the CPU for calculating the amount of funds having the secure password; and out putting the funds.

* * * * *